(12) United States Patent
Yoshida et al.

(10) Patent No.: US 7,400,519 B2
(45) Date of Patent: Jul. 15, 2008

(54) SWITCHING POWER SUPPLY

(75) Inventors: Koji Yoshida, Ikoma (JP); Mitsuhiro Matsuo, Osaka (JP); Satoshi Ikeda, Suita (JP); Yoshihiro Takeshima, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 9 days.

(21) Appl. No.: 10/520,984

(22) PCT Filed: Aug. 11, 2003

(86) PCT No.: PCT/JP03/10236

§ 371 (c)(1),
(2), (4) Date: Jan. 11, 2005

(87) PCT Pub. No.: WO2004/021554

PCT Pub. Date: Mar. 11, 2004

(65) Prior Publication Data

US 2006/0083029 A1    Apr. 20, 2006

(30) Foreign Application Priority Data

Aug. 29, 2002  (JP)  .............................. 2002-251031

(51) Int. Cl.
*H02M 7/217*    (2006.01)
*H02M 3/335*    (2006.01)

(52) U.S. Cl. .................. 363/127; 363/21.06; 363/21.14

(58) Field of Classification Search .............. 363/21.06, 363/21.14, 127, 17, 89, 90
See application file for complete search history.

(56) References Cited

U.S. PATENT DOCUMENTS

| 5,289,359 | A | * | 2/1994 | Ziermann ................. 363/21.11 |
| 5,619,403 | A | * | 4/1997 | Ishikawa et al. ......... 363/21.06 |
| 6,049,471 | A | * | 4/2000 | Korcharz et al. .............. 363/20 |
| 6,069,802 | A | * | 5/2000 | Priegnitz ................. 363/21.06 |
| 6,111,769 | A | * | 8/2000 | Zhang et al. ................. 363/127 |

(Continued)

FOREIGN PATENT DOCUMENTS

JP          11-89225 A          3/1999

(Continued)

*Primary Examiner*—Gary L Laxton
(74) *Attorney, Agent, or Firm*—Panitch Schwarze Belisario & Nadel LLP

(57) ABSTRACT

A switching power supply comprises one or more switching sections which repeat ON/OFF operation, a transformer having a primary winding and a secondary winding, a synchronous rectifier section for rectifying a voltage induced in the secondary winding when an input voltage is applied to the primary winding of the transformer by the switching section, a smoothing section for smoothing the voltage rectified by the synchronous rectifier section to obtain an output voltage, a PWM control circuit which generates a PWM signal for adjusting the output voltage to determine an ON/OFF ratio of the switching section, and a drive transformer for ON-OFF driving the synchronous rectifier section according to the PWM signal, and is configured so as to use the energy stored in the drive transformer or the transformer for the ON/OFF operation of the synchronous rectifier section.

2 Claims, 10 Drawing Sheets

U.S. PATENT DOCUMENTS

| | | | |
|---|---|---|---|
| 6,130,825 A | 10/2000 | Imamura et al. | |
| 6,169,683 B1 | 1/2001 | Farrington | |
| 6,185,114 B1 | 2/2001 | Matsumoto | |
| 6,188,592 B1 | 2/2001 | Farrington | |
| 6,452,818 B1 * | 9/2002 | Simopoulos | 363/21.06 |
| 6,650,169 B2 * | 11/2003 | Faye et al. | 327/404 |
| 6,674,658 B2 * | 1/2004 | Mao et al. | 363/127 |
| 6,711,035 B2 * | 3/2004 | Tomioka | 363/21.06 |
| 6,771,518 B2 * | 8/2004 | Orr et al. | 363/16 |

FOREIGN PATENT DOCUMENTS

| | | |
|---|---|---|
| JP | 3137045 A | 3/1999 |
| JP | 11-332233 A | 11/1999 |
| JP | 2000-184707 A | 6/2000 |
| JP | 2000-224848 A | 8/2000 |
| JP | 2000-262051 A | 9/2000 |
| JP | 2003-511004 A | 3/2003 |
| JP | 2003-512000 A | 3/2003 |
| JP | 2003-513606 A | 4/2003 |

* cited by examiner

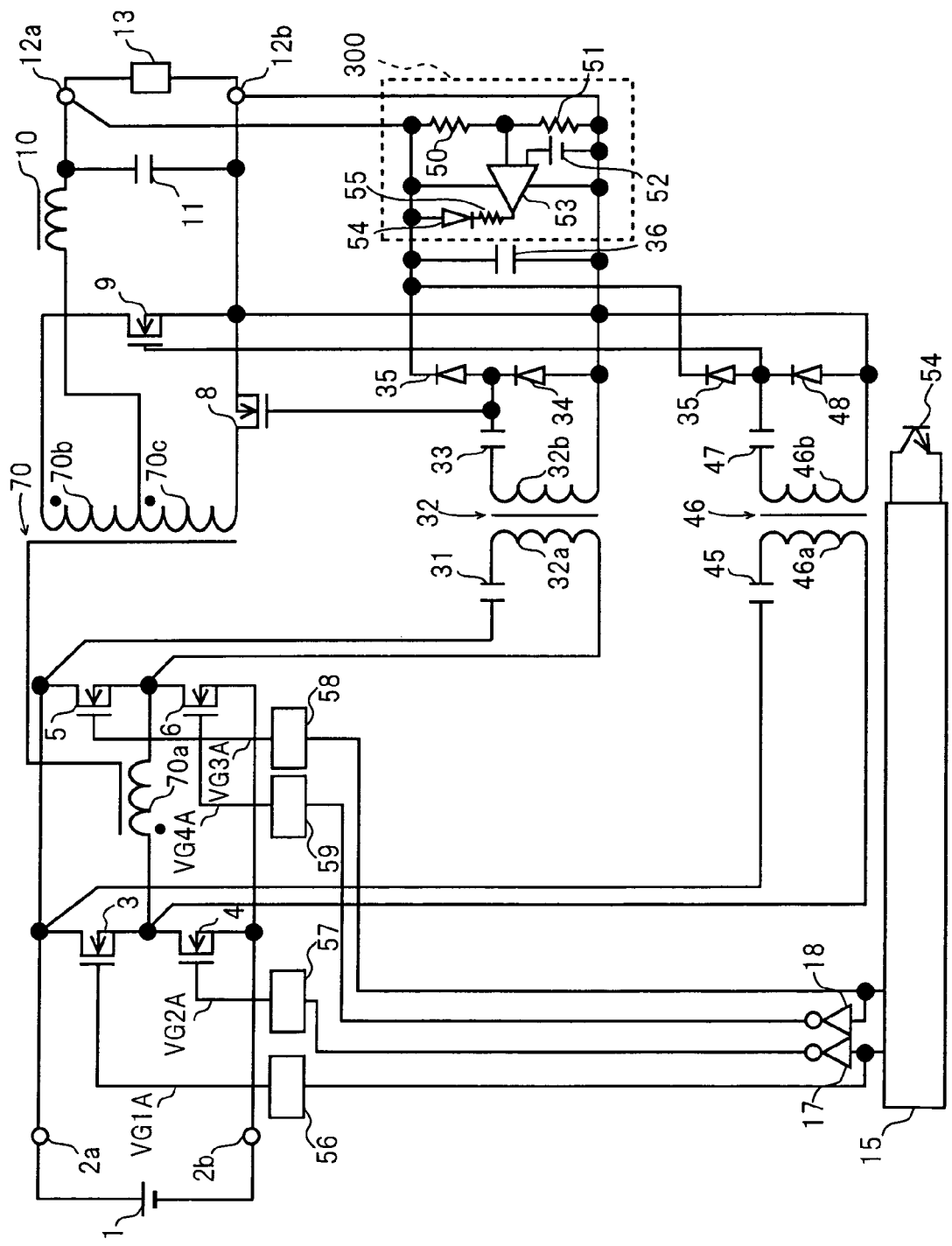
F I G. 7

SWITCHING POWER SUPPLY

CROSS-REFERENCE TO RELATED APPLICATION

This application is a Section 371 of International Application No. PCT/1JP2003/010236, filed Aug. 11, 2003, which was published in the Japanese language on Mar. 11, 2004, under International Publication No. WO 2004/021554 A1, the disclosure of which is incorporated herein by reference.

TECHNICAL FIELD

The present invention relates to a switching power supply for supplying a stabilized DC voltage to industrial and consumer electronic appliances. More particularly, the present invention relates to a switching power supply having driving circuits capable of carrying out synchronous-rectification drive with low losses.

BACKGROUND OF ART

In recent years, as electronic appliances have been made more inexpensive, compact, efficient and energy saving, more compact and efficient switching power supplies have been strongly demanded. Furthermore, for the reason such as the reduction of voltages in integrated circuits, the power supply voltages necessary for the electric appliances have been increasingly reduced. Even as to the switching power supplies conforming to such low power supply voltages, there is a problem that, with a rectifier circuit using usual rectifier diodes, a rectification loss becomes greater relative to the power supply output, and power supply efficiency is thereby reduced.

In recent years, since switching devices such as MOSFETs have become higher in performance, an attempt to configure a switching power supply on the synchronous rectification system where a rectifier circuit comprises such switching devices has been made. The MOSFET has a characteristic that, relative to the same-class rectifier diode, forward drop voltages can be made smaller and the rectification losses can be lower. However, the MOSFET has to be driven in synchronism with the switching power supply, so that an appropriate gate voltage needs to be formed.

A conventional switching power supply on the synchronous rectification system will be described below. FIG. 9 is a circuit diagram showing a configuration of a conventional full-bridge-type switching power supply. In FIG. 9, an input DC power supply 101, which comprises a circuit for rectifying and smoothing a commercial power supply or a battery, is connected across input terminals 102a and 102b. A first switching device 103 and a second switching device 104 each comprise a MOSFET, and the series circuit of the first switching device 103 and the second switching device 104 is connected across the input terminals 102a and 102b. The first switching device 103 and the second switching device 104 are alternately ON/OFF-driven by after-mentioned driving circuits. Similarly, a third switching device 105 and a fourth switching device 106 each comprise a MOSFET, and the series circuit of the third switching device 105 and the fourth switching device 106 is connected across the input terminals 102a and 102b. Furthermore, the third switching device 105 and the fourth switching device 106 are alternately ON/OFF-driven by after-mentioned driving circuits.

A transformer 107 has a primary winding 107a, a first secondary winding 107b and a second secondary winding 107c. One end of the primary winding 107a is connected to the connection point of the first switching device 103 and the second switching device 104, while the other end of the primary winding 107a is connected to the connection point of the third switching device 105 and the fourth switching device 106. The first secondary winding 107b and the second secondary winding 107c of the transformer 107 are connected in series, and the connection point of the first secondary winding 107b and the second secondary winding 107c of the transformer 107 is connected to one end of an inductance device 110.

A first synchronous rectifier device 108 and a second synchronous rectifier device 109 each comprise a MOSFET. Source terminals of the first synchronous rectifier device 108 and the second synchronous rectifier device 109 are connected to each other. The drain terminal of the first synchronous rectifier device 108 is connected to the second secondary winding 107c, while the drain terminal of the second synchronous rectifier device 109 is connected to the first secondary winding 107b.

One end of the series circuit of the inductance device 110 and a smoothing capacitor 111 is connected to the connection point of the source terminals of, respectively, the first synchronous rectifier device 108 and the second synchronous rectifier device 109. The other end of the series circuit thereof is connected to the connection point of the first secondary winding 107b and the second secondary winding 107c of the transformer 107. A smoothing circuit is comprised of the inductance device 110 and the smoothing capacitor 111.

Output terminals 112a and 112b which output stable electric power are provided across the smoothing capacitor 111. A load 113 which consumes electric power is connected across the output terminals 112a and 112b.

An auxiliary power supply 115 is connected to the input terminals 102a and 102b, and a stable voltage is supplied from the input DC power supply 101 to this auxiliary power supply 115. A control circuit 114 connected to the auxiliary power supply 115 generates a PWM signal according to a feedback signal from a photocoupler 154.

A first driving circuit 155 to a fourth driving circuit 158 connected to, respectively, the first switching device 103 to the fourth switching device 106 output drive signals of the first switching device 103 to the fourth switching device 106 respectively according to the PWM signals output from the control circuit 114. A first npn transistor 116, a first pnp transistor 117, a second npn transistor 118 and a second pnp transistor 119 are each drive-controlled by the PWM signal from the control circuit 114. A fifth driving circuit 159 comprises the first npn transistor 116 and the first pnp transistor 117, while a sixth driving circuit 160 comprises the second npn transistor 118 and the second pnp transistor 119. The series circuit of a first capacitor 120 and a primary winding 121a of a drive transformer 121 is connected across the fifth driving circuit 159 and the sixth driving circuit 160. The drive transformer 121 has the primary winding 121a, a first secondary winding 121b and a second secondary winding 121c, and is driven according to the PWM signal of the control circuit 114.

A first reverse comprising a first FET 122 and a first resistance 123 is provided on the secondary side of the drive transformer 121 to invert a signal of the first secondary winding 121b of the drive transformer 121. A seventh driving circuit 161 comprises a third npn transistor 124 and a third pnp transistor 125, and drives the first synchronous rectifier device 108 according to the output of the first reverse.

Furthermore, a second reverse comprising a second FET 126 and a second resistance 127 is provided on the secondary side of the drive transformer 121 to invert a signal of the second secondary winding 121c of the drive transformer 121. An eighth driving circuit 162 comprises a fourth npn transistor 128 and a fourth pnp transistor 129, and drives the second synchronous rectifier device 109 according to the output of the second reverse.

In an output voltage detection circuit 350, a first detection resistance 150 and a second detection resistance 151 are connected in series with the output terminals 112a and 112b, and divide an output voltage. A differential amplifier 153 compares the voltage obtained by dividing the output voltage and the voltage of a reference power supply 152 and amplifies the differential therebetween. A limit resistance 163 determines a current to be passed through the photocoupler 154 according to the voltage error-amplified in the differential amplifier 153.

The first reverse, the second reverse, the photocoupler 154, the seventh driving circuit 161 and the eighth driving circuit 162 are connected to the output terminals 112a and 112b, which serve as the drive power supplies thereof.

FIG. 10 is an operation waveform diagram showing a state of the operation of each part in the conventional switching power supply in FIG. 9. A signal VG1 shown in part (a) of FIG. 10 is a first PWM signal of the control circuit 114, and ON/OFF-drives the first switching device 103 and the fourth switching device 106 simultaneously via the first driving circuit 155 and the fourth driving circuit 158. A signal VG2 shown in part (b) of FIG. 10 is a second PWM signal of the control circuit 114, and ON/OFF-drives the second switching device 104 and the third switching device 105 simultaneously via the second driving circuit 156 and the third driving circuit 157.

A signal VT1 shown in part (c) of FIG. 10 represents a waveform of the voltage generated in the first secondary winding 121b of the drive transformer 121. A signal VT2 shown in part (d) of FIG. 10 represents the voltage generated in the second secondary winding 121c of the drive transformer 121. A signal VG3 shown in part (e) of FIG. 10 represents the output of the first reverse. The first synchronous rectifier device 108 is ON/OFF-driven under the signal VG3 from this first reverse. A signal VG4 shown in part (f) of FIG. 10 represents the output of the second reverse. The second synchronous rectifier device 109 is ON/OFF-driven under the signal VG4 from this second reverse.

Furthermore, IG1 shown in part (g) of FIG. 10 represents the drive current of the first synchronous rectifier device 108. IG2 shown in part (h) of FIG. 10 represents a drive current of the second synchronous rectifier device 109.

Next, the operation of the conventional switching power supply configured as mentioned above will be described.

When the first PWM signal VG1 from the control circuit 114 is driven high (high level) at time T0 shown in FIG. 10, the first switching device 103 and the fourth switching device 106 are simultaneously turned ON. When the first switching device 103 and the fourth switching device 106 are turned ON as described above, an input voltage is applied to the primary winding 107a of the transformer 107 and a voltage is generated in the secondary winding 107b of the transformer 107. At this time, a voltage is also applied to the primary winding 121a of the drive transformer 121, and a positive voltage is generated in the first secondary winding 121b of the drive transformer 121, while a negative voltage is generated in the second secondary winding 121c of the drive transformer 121. As a result, the output of the first reverse goes low (low level), while the output of the second reverse remains high (high level), and the first synchronous rectifier device 108 is turned OFF, while the second synchronous rectifier device 109 is in the ON state.

The voltage generated in the first secondary winding 107b of the transformer 107 is applied via the second synchronous rectifier device 109 in the ON state to the smoothing circuit comprising the inductance device 110 and the smoothing capacitor 111.

When the first PWM signal VG1 is driven low at time T1, the first switching device 103 and the fourth switching device 106 are turned OFF. At this time, the voltage applied to the primary winding 121a of the drive transformer 121 becomes zero, and the voltages generated in the first secondary winding 121b and the second secondary winding 121c of the drive transformer 121 also become zero. As a result, the first reverse and the second reverse are both high, and the first synchronous rectifier device 108 and the second synchronous rectifier device 109 are simultaneously in the OFF state. The current flowing through the inductance device 110 divides to flow through the first secondary winding 107b and the second secondary winding 107c of the transformer 107 via the first synchronous rectifier device 108 and the second synchronous rectifier device 109 in the ON state. As a result, the exciting current of the transformer 107 becomes continuous. At this time, the voltages generated in the first secondary winding 107b and the second secondary winding 107c of the transformer 107 become zero, so that the voltage applied to the smoothing circuit (110, 111) also becomes zero.

When the second PWM signal VG2 from the control circuit 114 is driven high (high level) at time T2, the second switching device 104 and the third switching device 105 are simultaneously turned ON. When the second switching device 104 and the third switching device 105 are simultaneously turned ON as described above, an input voltage is applied to the primary winding 107a of the transformer 107 in the direction opposite to that at time T0. At this time, a voltage of the opposite polarity is also applied to the drive transformer 121, and the first synchronous rectifier device 108 is turned ON by the first reverse, while the second synchronous rectifier device 109 is turned OFF by the second reverse. As a result, the voltage generated in the second secondary winding 107c of the transformer 107 is applied via the first synchronous rectifier device 108 to the smoothing circuit (110, 111).

In the conventional switching power supply, by the operation mentioned above, the time of the voltage applied to the smoothing circuit is changed according to the ON/OFF ratios of the first PWM signal VG1 and the second PWM signal VG2, and the output voltage can be thereby adjusted. The output voltage is detected by the first detection resistance 150 and the second detection resistance 151, compared with the voltage of the reference power supply 152 and amplified at the differential amplifier 153, and input to the photocoupler 154. The control circuit 114 generates and outputs a PWM signal according to the output signal from the photocoupler 154. In the conventional switching power supply, as mentioned above, a negative feedback circuit is comprised of the control circuit 114, and the output voltage is stabilized.

However, with the configuration of the conventional switching power supply configured as mentioned above, when the synchronous rectifier device is driven, at the turn-on time, the drive current is supplied from the output voltage via the driving circuit, and the gate charge is charged. At the turn-off time, the gate charge is short-circuit discharged via the driving circuit. Therefore, there is a problem that, when the synchronous rectifier device is ON/OFF-driven, a rectification loss is produced. To reduce the conduction loss of the synchronous rectifier device, it is desirable to use a synchronous rectifier device which is large in chip size. The synchronous rectifier device which is large in chip size has a problem that, since the gate capacitance is large and the drive loss is great, the rectification loss including this drive loss cannot be reduced. In the conventional switching power supply configured as mentioned above, there is a problem that, since the output voltage is used as a power supply of the driving circuit, the synchronous rectifier device cannot be driven when the output voltage is extremely low, for example, 1V.

The present invention intends to solve the problems in the conventional switching power supply, and is intended to provide a high-efficiency switching power supply which supplies a voltage with stability while charging and discharging the gate of a synchronous rectifier device without any loss, and can thereby exert fully the effect of the synchronous rectification.

DISCLOSURE OF INVENTION

In order to attain the above-mentioned objects, the switching power supply in accordance with the present invention comprises:

at least one switching section which repeats ON/OFF operation to convert an input voltage to an AC voltage;

a transformer having a primary winding, to which the AC voltage obtained by the conversion performed by the switching section is applied, and a secondary winding;

a synchronous rectifier section for rectifying a voltage induced in the secondary winding of the transformer by switching operation;

a smoothing section for smoothing the voltage rectified by the synchronous rectifier section to form an output voltage;

a PWM control circuit which forms a PWM signal for controlling the output voltage to determine an ON/OFF ratio of the switching section; and a drive transformer which stores energy necessary for the switching operation of the synchronous rectifier section to ON/OFF-drive the synchronous rectifier section according to the PWM signal. The switching power supply configured as mentioned above supplies a voltage with stability while charging and discharging the gate of a synchronous rectifier device without any loss, and can thereby exert fully the effect of the synchronous rectification.

The switching power supply in accordance with the present invention comprises: at least one switching section which repeats ON/OFF operation to convert an input voltage to an AC voltage;

a transformer having a primary winding, to which the AC voltage obtained by the conversion performed by the switching section is applied, and a secondary winding;

a synchronous rectifier section for rectifying the voltage induced in the secondary winding of the transformer by switching operation;

a smoothing section for smoothing the voltage rectified by the synchronous rectifier section to form an output voltage;

a PWM control circuit which forms a PWM signal for controlling the output voltage to determine an ON/OFF ratio of the switching section;

an auxiliary power supply for use in driving the synchronous rectifier section;

a first drive switch and a second drive switch which are connected in series to form a first series circuit, the first series circuit being connected to an output of the auxiliary power supply;

a drive transformer which has a primary winding and a secondary winding, stores energy for driving the synchronous rectifier section, and is connected so that a drive current of the synchronous rectifier section flows through the secondary winding;

a first capacitor which is connected in series with the primary winding of the drive transformer so that a second series circuit is formed, the second series circuit being connected across the second drive switch to eliminate a DC voltage to be applied to the drive transformer; and a drive control circuit which makes the first drive switch and the second drive switch perform ON/OFF operation alternately in synchronism with the PWM signal and applies a positive/negative voltage by alternation to the primary winding of the drive transformer to store the exciting energy, and ON/OFF-drives the synchronous rectifier section by the exciting energy stored in the period during which the first drive switch and the second drive switch are simultaneously OFF. The switching power supply configured as mentioned above supplies a voltage with stability while charging and discharging the gate of a synchronous rectifier device without any loss, and can thereby exert fully the effect of the synchronous rectification.

Furthermore, the switching power supply in accordance with the present invention may have a drive transformer control circuit which sets a desired OFF period according to the PWM signal and repeats ON/OFF operation alternately, and may be configured so that the drive transformer control circuit drives the drive transformer via the capacitor.

Furthermore, the switching power supply in accordance with the present invention may be configured so that the synchronous rectifier section is connected via a capacitor to the primary side of the drive transformer, a drive transformer control circuit is connected via a capacitor to the secondary side of the drive transformer, and the drive transformer is driven by the ON/OFF operation of the drive transformer control circuit.

Furthermore, the switching power supply in accordance with the present invention may be configured so that the drive transformer control circuit has two switching devices which repeat ON/OFF operation alternately, sets a desired OFF period according to the PWM signal, and drives the drive transformer via the capacitor.

The switching power supply in accordance with another aspect of the present invention comprises: at least two switching sections which have minuscule stop periods and repeat ON/OFF operation to convert an input voltage to an AC voltage;

a transformer which has a primary winding, to which the AC voltage obtained by the conversion performed by the switching section is applied, and a secondary winding, and stores exciting energy;

a synchronous rectifier section for rectifying a voltage induced in the secondary winding of the transformer by switching operation;

a smoothing section for smoothing the voltage rectified by the synchronous rectifier section to form an output voltage;

a PWM control circuit which forms a PWM signal for controlling the output voltage to determine an ON/OFF ratio of the switching section; and a drive transformer for ON/OFF-driving the synchronous rectifier section according to the PWM signal or a voltage signal applied to the switching section, and is configured so that the switching operation of the synchronous rectifier section is performed via the drive transformer by the energy stored in the transformer. The switching power supply configured as mentioned above is an apparatus which supplies a voltage with stability while charging and discharging the gate of a synchronous rectifier device without any loss to thereby exert fully the effect of the synchronous rectification, and is thus highly efficient.

Furthermore, the switching power supply in accordance with the present invention may be configured so that the voltage applied to the switching section is applied to the primary winding of the drive transformer via the capacitor.

Furthermore, in the switching power supply in accordance with the present invention, the switching section may comprise a bridge-type or push-pull-type converter.

In addition, in the switching power supply in accordance with the present invention, the PWM control circuit may exercise control so that the switching section short-circuits the primary winding of the transformer, and sets the period during which energy necessary for the switching operation of the synchronous rectifier section can be retained in the transformer.

BRIEF DESCRIPTION OF DRAWINGS

FIG. 7 is a circuit diagram showing a configuration of a switching power supply in accordance with Embodiment 2 of the present invention.

BEST MODE FOR CARRYING OUT THE INVENTION

Preferred embodiments of a switching power supply in accordance with the present invention will be described below referring to the accompanying drawings.

EMBODIMENT 1

Figure 1:
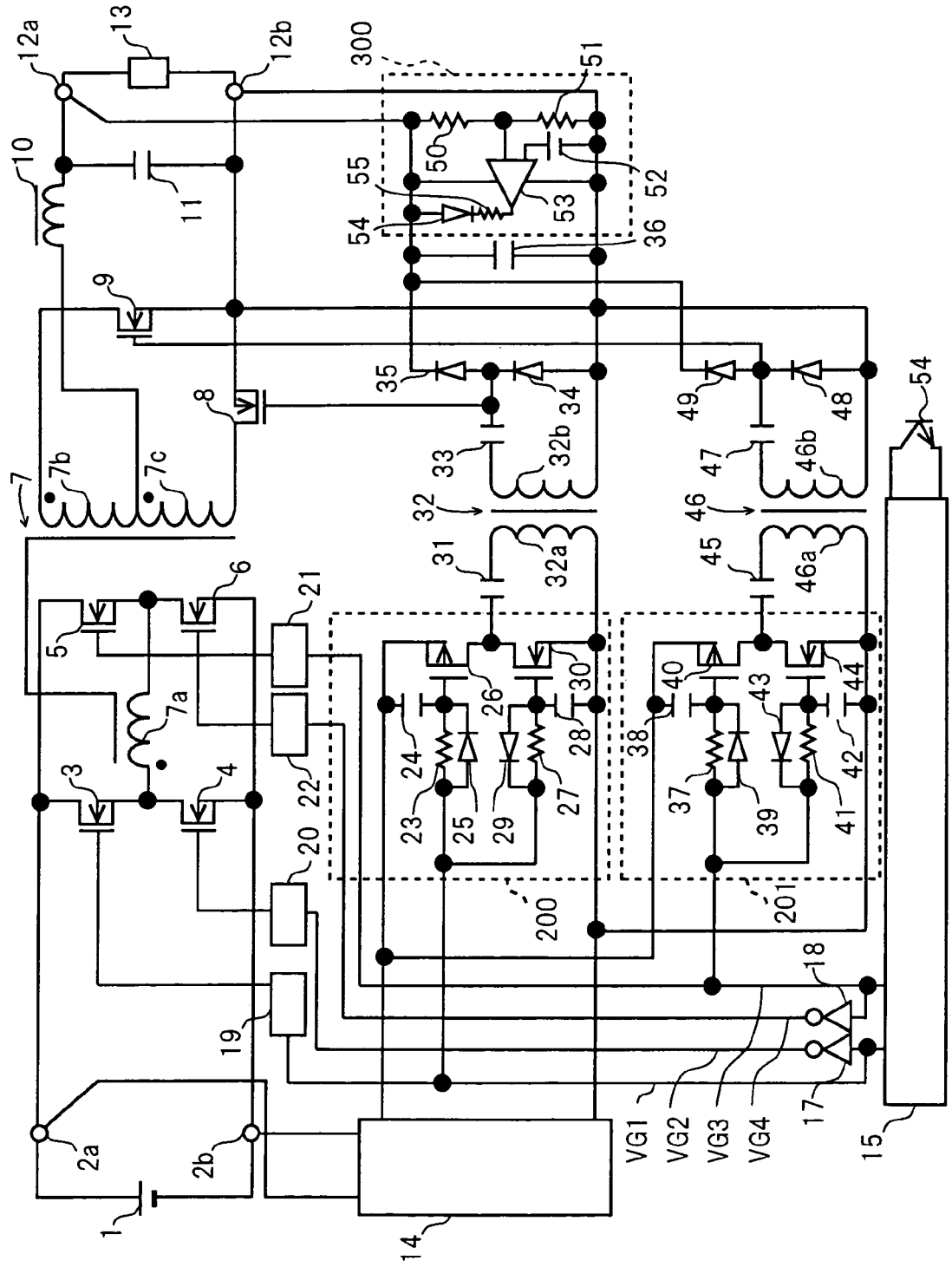
FIG. 1 is a circuit diagram showing a configuration of a switching power supply in accordance with Embodiment 1 of the present invention.

FIG. 1 is a circuit diagram showing a configuration of a switching power supply in accordance with Embodiment 1 of the present invention.

In FIG. 1, an input DC power supply 1 comprises a circuit for rectifying and smoothing a commercial power supply or a battery, and is connected across input terminals 2a and 2b. A first switching device 3 and a second switching device 4 each comprise a MOSFET. The series circuit of the first switching device 3 and the second switching device 4 is connected across the input terminals 2a and 2b. The first switching device 3 and the second switching device 4 are configured so as to be alternately ON/OFF-driven by a first driving circuit 19 and a second driving circuit 20. Similarly, a third switching device 5 and a fourth switching device 6 each comprise a MOSFET. The series circuit of the third switching device 5 and the fourth switching device 6 is connected across the input terminals 2a, 2b. The third switching device 5 and the fourth switching device 6 are configured so as to be alternately ON/OFF-driven by a third driving circuit 21 and a fourth driving circuit 22.

A transformer 7 has a primary winding 7a, a first secondary winding 7b and a second secondary winding 7c. One end of the primary winding 7a is connected to the connection point of the first switching device 3 and the second switching device 4. The other end of the primary winding 7a is connected to the connection point of the third switching device 5 and the fourth switching device 6. The first secondary winding 7b and the second secondary winding 7c of the transformer 7 are connected in series. The connection point of the first secondary winding 7b and the second secondary winding 7c of the transformer 7 is connected to one end of an inductance device 10.

A first synchronous rectifier device 8 and a second synchronous rectifier device 9 each comprises a MOSFET. Source terminals of the first synchronous rectifier device 8 and the second synchronous rectifier device 9 are connected to each other. The drain terminal of the first synchronous rectifier device 8 is connected to the second secondary winding 7c, while the drain terminal of the second synchronous rectifier device 9 is connected to the first secondary winding 7b.

One end of the series circuit of the inductance device 10 and a smoothing capacitor 11 is connected to the connection point of the source terminals of, respectively, the first synchronous rectifier device 8 and the second synchronous rectifier device 9. The other end of this series circuit is connected to the connection point of the first secondary winding 7b and the second secondary winding 7c of the transformer 7. A smoothing circuit is comprised of the inductance device 10 and the smoothing capacitor 11.

Output terminals 12a and 12b which output stable electric power are provided across the smoothing capacitor 11. A load 13 which consumes electric power is connected across the output terminals 12a and 12b.

An auxiliary power supply 14 is connected across the input terminals 2a and 2b, and a stable voltage is supplied from the input DC power supply 1 to this auxiliary power supply 14. A PWM control circuit 15 connected to the auxiliary power supply 14 generates a PWM signal according to a feedback signal from a photocoupler 54.

The first driving circuit 19 to the fourth driving circuit 22 connected to, respectively, the first switching device 3 to the fourth switching device 6 output drive signals of the first switching device 3 to the fourth switching device 6 according to two kinds of PWM signals VG1 and VG2 output from the PWM control circuit 15.

Inverters 17 and 18 serving as reverses connected to the PWM control circuit 15 invert the PWM signals VG1 and VG2 respectively output from the PWM control circuit 15.

In the switching power supply in accordance with Embodiment 1, as shown in FIG. 1, a first drive transformer control circuit 200, to which the first PWM signal VG1 from the PWM control circuit 15 is input, and a second drive transformer control circuit 201, to which the second PWM signal VG2 from the PWM control circuit 15, are provided.

In the first drive transformer control circuit 200, a first resistance 23, a first capacitor 24, a first diode 25 and a first p-channel FET 26 are provided. The first p-channel FET 26 is ON/OFF-driven according to the input PWM signal VG1. In the first drive transformer control circuit 200, the configuration is such that the turn-on of the first p-channel FET 26 is delayed by the resistance 23 and the first capacitor 24, while the turn-off thereof is carried out without delay via the first diode 25.

Furthermore, in the first drive transformer control circuit 200, a second resistance 27, a second capacitor 28, a second diode 29 and a first n-channel FET 30 are provided. The first n-channel FET 30 is ON/OFF-driven according to the input first PWM signal VG1. In the first drive transformer control circuit 200, the configuration is such that the turn-on of the first n-channel PET is delayed by the second resistance 27 and the second capacitor 28. The turn-off thereof is carried out without delay.

The first p-channel FET 26 and the first n-channel FET 30 are connected in series, and this series circuit is supplied with electric power from the auxiliary power supply 14. One end of a third capacitor 31 is connected to the connection point of the first p-channel FET 26 and the first n-channel FET 30. A first drive transformer 32 is connected to the other end of the third capacitor 31. The first drive transformer 32 has a primary winding 32a and a secondary winding 32b.

The series circuit of a forth capacitor 33 and a third diode 34 is connected to the secondary side of the first drive transformer 32. The first synchronous rectifier device 8 is connected so as to be driven by the applied voltage of the third diode 34. A fifth capacitor 36 is charged via a fourth diode 35 by the voltage induced across the third diode 34.

In the second drive transformer control circuit 201, a third resistance 37, a sixth capacitor 38, a fifth diode 39 and a second p-channel FET 40 are provided. The second p-channel FET 40 is ON/OFF-driven according to the input second PWM signal VG2. In the second drive transformer control circuit 201, the configuration is such that the turn-on of the second p-channel FET 40 is delayed by the third resistance 37 and the sixth capacitor 38. The turn-off thereof is carried out without delay via the fifth diode 39.

Furthermore, in the second drive transformer control circuit 201, a fourth resistance 41, a seventh capacitor 42, a sixth diode 43 and a second n-channel FET 44 are provided. The second n-channel FET 44 is ON/OFF-driven according to the input second PWM signal VG2. In the second drive transformer control circuit 201, the configuration is such that the turn-on of the second n-channel FET 44 is delayed by the fourth resistance 41 and the seventh capacitor 42. The turn-off thereof is carried out without delay.

In the second drive transformer control circuit 201, as in the first drive transformer control circuit 200 mentioned above, the second p-channel FET 40 and the second n-channel FET 44 are connected in series, and this series circuit is supplied with electric power from the auxiliary power supply 14. One end of an eighth capacitor 45 is connected to the connection point of the second p-channel FET 40 and the second n-channel FET 44. A second drive transformer 46 is connected to the other end of the eighth capacitor 45. The second drive transformer 46 has a primary winding 46a and a secondary winding 46b.

The series circuit of a ninth capacitor 47 and a seventh diode 48 is connected to the secondary side of the second drive transformer 46. The second synchronous rectifier device 9 is connected so as to be driven by the applied voltage of the seventh diode 48. The fifth capacitor 36 is charged via an eighth diode 49 by the voltage induced across the diode 48.

The switching power supply is configured so that the voltage across the output terminals 12a and 12b is input to an output voltage detection circuit 300, detected therein, and then fed back to the PWM control circuit 15. In the output voltage detection circuit 300, the output voltage is divided by a first detection resistance 50 and a second detection resistance 51, and the divided voltage is compared with the reference voltage of a reference power supply 52 and amplified by a differential amplifier 53. The amplified signal is input via a limit resistance 55 to the photocoupler 54, whereby the input current of the photocoupler 54 is determined. The PWM control signal of the PWM control circuit 15 is adjusted by the output current of the photocoupler 54. A feedback circuit is comprised of the output voltage detection circuit 300 configured as mentioned above. The output voltage is stabilized by this feedback circuit.

The operation of the switching power supply in accordance with Embodiment 1 configured as mentioned above will be described referring to the waveform diagram in FIG. 2.

Figure 2:
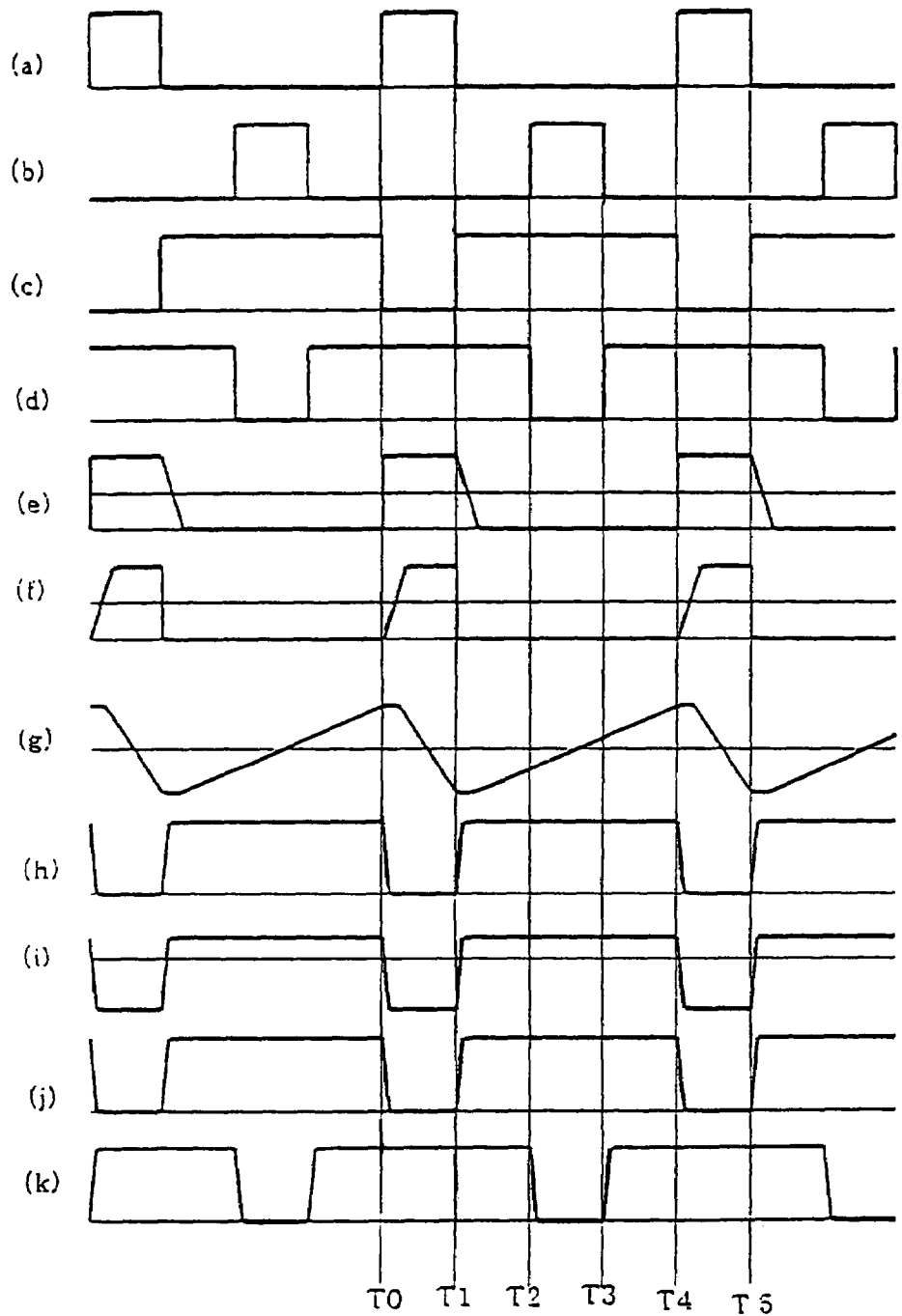
FIG. 2 is a waveform diagram showing the operation in the switching power supply in accordance with Embodiment 1 of the present invention.

In FIG. 2, part (a) shows the drive signal VG1 output from the PWM control circuit 15. The drive signal VG1 is the signal which is input via the first driving circuit 19 to the first switching device 3 to drive the first switching device 3. Part (b) of FIG. 2 shows a drive signal VG3 output from the PWM control circuit 15. The drive signal VG3 is the signal which is input via the third driving circuit 21 to the third switching device 5 to drive the third switching device 5. Part (c) of FIG. 2 shows an inverse signal (VG2) of the drive signal VG1 output from the PWM control circuit 15, which is a signal for driving the second switching device 4 via the second driving circuit 20. Part (d) of FIG. 2 shows an inverse signal (VG4) of the drive signal VG3 (part (b) of FIG. 2), which is a signal for driving the fourth switching device 6 via the fourth driving circuit 22. The first to fourth driving circuits 19, 20, 21 and 22 are driven so that the ON operation is performed with the timing of the turn-on a little behind the input signals VG1 to VG4.

Part (e) of FIG. 2 shows a gate voltage of the first p-channel FET 26. Part (f) of FIG. 2 shows a gate voltage of the first n-channel FET 30. Part (g) of FIG. 2 shows a current flowing through the primary winding 32a of the first drive dransformer 32. Part (h) of FIG. 2 shows a drain voltage of the first p-channel FET 26. Part (i) of FIG. 2 shows a waveform of the voltage of the primary winding 32a of the first drive transformer 32. Part (j) of FIG. 2 shows a waveform of the drive voltage of the first synchronous rectifier device 8. Part (k) of FIG. 2 shows a waveform of the drive voltage of the second synchronous rectifier device 9.

The PWM control circuit 15 generates the drive signal VG1 and the drive signal VG3 serving as PWM signals between which there is a phase difference of 180 degrees. The drive signal VG1 drives the first switching device 3 via the first driving circuit 19 and, at the same time, drives the first p-channel FET 26 and the first n-channel FET 30. At this time, the voltage Vp1 applied to the gate of the first p-channel FET 26 takes a waveform shown in part (e) of FIG. 2. Consequently, the turn-off of the first p-channel FET 26 is timed with the rising edge of the drive signal VG1, while the turn-on thereof lags a little behind the falling edge of the drive signal VG1. The delay time at this time is determined by the time constant of the first resistance 23 and the first capacitor 24. Similarly, the voltage Vn1 shown in part (f) of FIG. 2 is applied to the gate of the first n-channel FET 30. Consequently, the turn-on of the first n-channel FET lags a little behind the rising edge of the drive signal VG1, while the turn-off thereof is timed with the falling edge of the drive signal VG1. As a result, the first p-channel FET 26 and the first n-channel FET 30 have the instantaneous periods during which they are simultaneously in the OFF state, and operate ON/OFF operation alternately.

Part (g) of FIG. 2 shows a waveform of the current of the first drive transformer 32. Since the exciting inductance of the first drive transformer 32 is set small, the exciting current flows there trough. The switching power supply operates so that the paracitic capacitance including the gate capacitance of the first synchronous rectifier device 8 is charged and discharged by this exciting current. In other words, when the first p-channel FET 26 is turned ON (part (e) of FIG. 2) and the first n-channel FET 30 is turned off (part (f) of FIG. 2) at time T1, the output voltage of the auxiliary power supply 14 is applied to the series circuit of the primary winding 32a of the first drive transformer 32 and the third capacitor 31. The voltage from which the DC components are removed by the third capacitor 31 is applied to the primary winding 32a of the first drive transformer 32. As a result, the current flowing through the primary winding 32a of the first drive transformer 32 increases, whereby the exciting energy is stored in the first drive transformer 32.

When the first p-channel FET 26 is turned OFF at time T4, by the stored exciting energy, the gate charge of the first synchronous rectifier device 8 is extracted, and the first synchronous rectifier device 8 is turned OFF. When the drain voltage of the first p-channel FET 26 reaches zero, the body diode of the first n-channel FET 30 is turned ON. The delay time is provided after the turn-off of the first p-channel FET 26, and after the delay time, the first n-channel FET 30 is turned ON. At this time, the discharge of the gate capacitance of the first synchronous rectifier device 8 is completed just before the turn-on of the first n-channel 30, so that the energy loss does not occur.

When the first n-channel FET 30 is turned ON, a negative voltage is applied to the primary winding 32a of the first drive transformer 32, and the exciting energy decreases. Since the third capacitor 31 is connected in series with the primary winding 32a of the first drive transformer 32, no DC current flows. Therefore, the average value of the current becomes zero, whereby the current of the primary winding 32a of the first drive transformer 32 becomes negative.

When the first n-channel FET 30 is turned OFF in synchronism with the falling edge of the drive signal VG1, by the energy stored in the primary winding 32a of the first drive transformer 32, the gate capacitance of the first synchronous rectifier device 8 is charged, and the first synchronous rectifier device 8 is turned ON. When the drain voltage of the first p-channel FET 26 increases to the output voltage of the auxiliary power supply 14, the body diode of the first p-channel FET 26 is turned ON, and the exciting current of the first drive transformer 32 is regenerated to the side of the auxiliary power supply. The first p-channel FET 26 is turned ON after a slight delay so as to be placed into the ON state after the gate capacitance of the first synchronous rectifier device 8 is fully charged, so that the charge current is not supplied from the side of the auxiliary power supply.

When the first n-channel FET 30 is turned ON, exciting energy is stored in the first drive transformer 32. By the above-mentioned operation, charge and discharge of the gate capacitance of the first synchronous rectifier device 8 is carried out, and by the ON/OFF operation of the first n-channel FET 30 and the first p-channel FET 26, charge and discharge thereof is not directly carried out, but by the energy stored in the exciting inductance of the first drive transformer 32, charge and discharge thereof is carried out.

By operating as mentioned above, the operation to charge and discharge the gate capacitance corresponds to the movement of the energy between the exciting inductance and the gate capacitance, so that the energy loss does not occur, and it is possible to drive the gate with substantially no loss.

In the switching power supply in accordance with Embodiment 1, as with the drive operation of the first synchronous rectifier device 8, the drive operation of the second synchronous rectifier device 9 involves no loss. Furthermore, since the drive operation of the second synchronous rectifier device 9 is substantially the same as the drive operation of the first synchronous rectifier device 8, the description thereof is omitted here. By being provided in this way, the synchronous rectifier devices 8 and 9 can be ON/OFF-driven under the drive signal VG1 and the drive signal VG3. In Embodiment 1, the second switching device 4 and the fourth switching device 6 are driven by the use of the inverse signals of the drive signal VG1 and the drive signal VG3, and with such a configuration, the second switching device 4 and the fourth switching device 6 are simultaneously placed in the ON state, whereby the transformer 7 can keep the energy. The ability of the transformer 7 to keep energy makes the operation to charge and discharge the parasitic capacitances of the first switching device 3 to the fourth switching device 6 possible, and these parasitic capacitances are discharged immediately before the turn-on, so that the switching losses can be reduced. Since the operation other than mentioned above is similar to that in the conventional switching power supply, the description of the operation is omitted.

In the configuration in accordance with Embodiment 1, the fifth capacitor 36 is charged at the peak value of the drive signals of the fist synchronous rectifier device 8 and the second synchronous rectifier device 9. If the turns ratios of the first drive transformer 32 and the second drive transformer 46 are each set to 1:1, the peak value of the gate signals of the first synchronous rectifier device 8 and the second synchronous rectifier device 9 is almost the same as the output voltage of the auxiliary power supply 14, which is a stable voltage. As shown in FIG. 1, by using the voltages of the first drive transformer 32 and the second drive transformer 46 to supply the voltages to the differential amplifier 53 and the photocoupler 54, it is possible to supply desired voltages to the gates of the first synchronous rectifier device 8 and the second synchronous rectifier device 9 even when the output voltage is low.

Incidentally, the full-bridge converter has been taken as an example and described herein, but if a similar driving circuit is used in a half-bridge converter, a push-pull converter, a forward converter or a flyback converter, a similar effect can be obtained.

The forward converter and the flyback converter will be described below by example.

Figure 3:
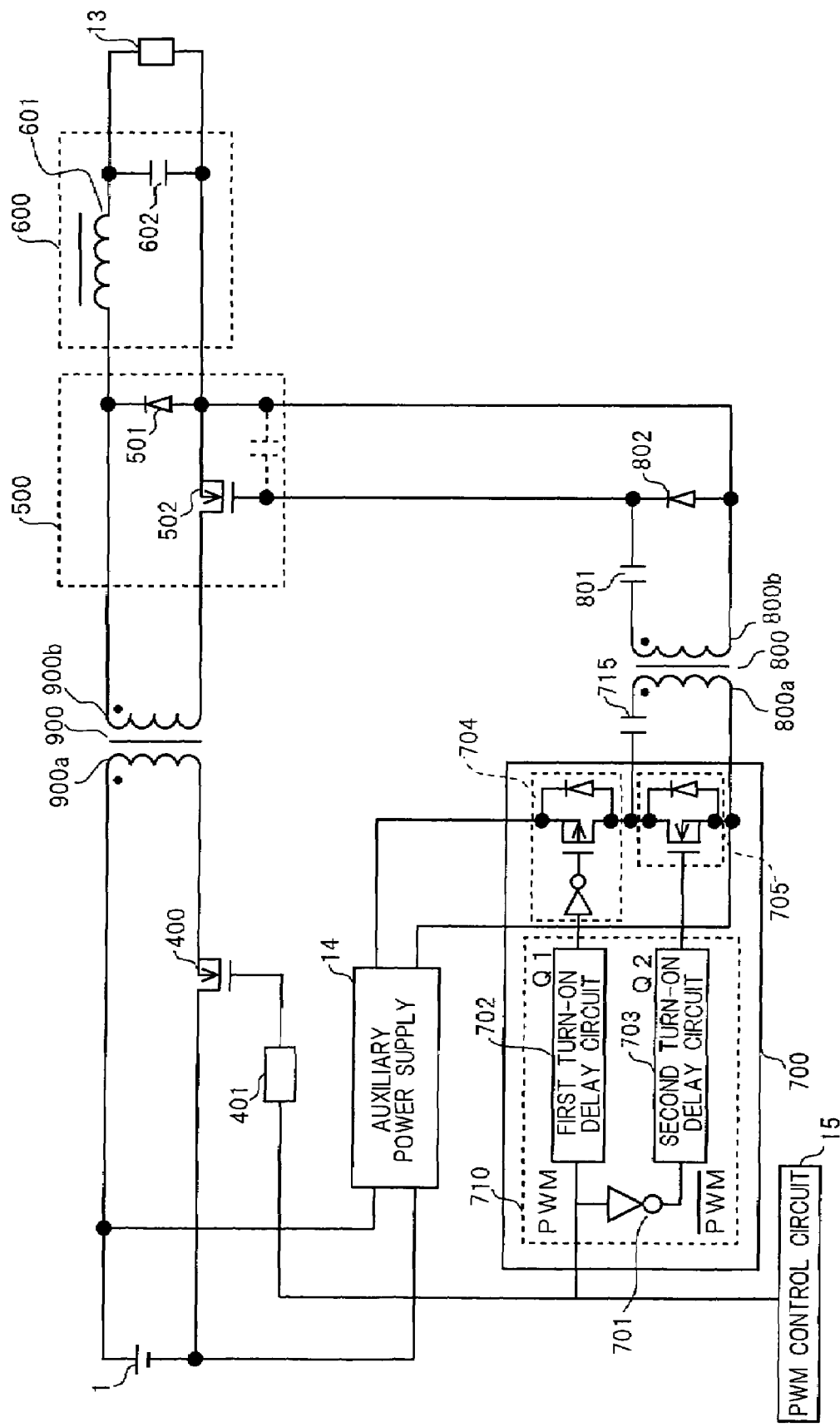
FIG. 3 is a circuit diagram showing a configuration of a single forward converter, which is a variation of the switching power supply in accordance with Embodiment 1 of the present invention.
Figure 5:
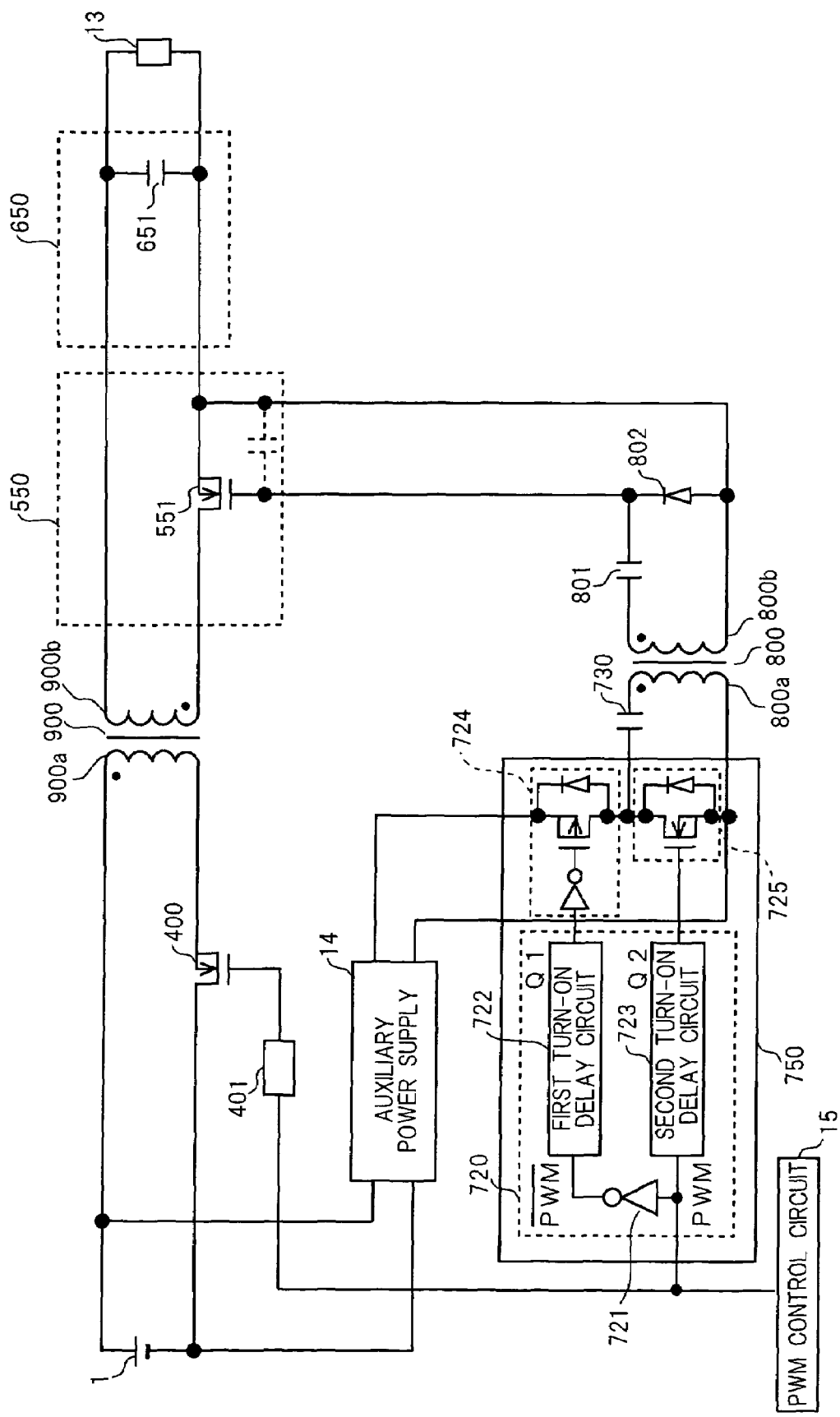
FIG. 5 is a circuit diagram showing a configuration of a single flyback converter, which is another variation of the switching power supply in accordance with Embodiment 1 of the present invention.

FIG. 3 is a circuit diagram showing a configuration of a single forward converter, which is a variation of the switching power supply in accordance with Embodiment 1 of the present invention. FIG. 5 is a circuit diagram showing a configuration of a single flyback converter, which is another variation of the switching power supply in accordance with Embodiment 1 of the present invention. In FIG. 3 and FIG. 5, the same numerals are applied to the components having the same functions and structures as those of the above-mentioned switching power supply in accordance with Embodiment 1 have, and part of the configuration is shown by the block diagrams.

In FIG. 3, a switching device 400 connected to the input DC power supply 1 comprises a MOSFET. The switching device 400 is configured so as to be ON/OFF-driven by a driving circuit 401.

A transformer 900 has a primary winding 900a and a secondary winding 900b. One end of the primary winding 900a is connected to the switching device 400. The other end of the primary winding 900a is connected to the input DC power supply 1.

One end of the secondary winding 900b of the transformer 900 is connected to one end of an inductance device 601. The other end of the secondary winding 900b of the transformer 900 is connected to a synchronous rectifier device 502. The synchronous rectifier device 502 comprises a MOSFET. The synchronous rectifier device 502 is connected in series with a diode 501. The series circuit of the synchronous rectifier device 502 and the diode 501 is connected across the secondary winding 900b of the transformer 900. A synchronous rectification means 500 comprises the synchronous rectifier device 502 and the diode 501.

One end of the series circuit of the inductance device 601 and a smoothing capacitor 602 is connected to the connection point of the synchronous rectifier device 502 and the anode terminal of the diode 501, while the other end of this series circuit is connected to the secondary winding 900b of the transformer 900. A smoothing means 600 comprises the inductance device 601 and the smoothing capacitor 602. The load 13 is connected across the smoothing capacitor 602.

Stable voltages are supplied from the auxiliary power supply 14 connected to the input DC power supply 1 to a first drive switch 704 and a second drive switch 705 of a drive transformer control circuit 700. The PWM control circuit 15 connected to the auxiliary power supply 14 generates a PWM signal in order to control the output according to the feedback signal or the like.

The first drive switch 704 comprises a p-channel FET, its body diode and a reverse, and when the input to the reverse is high, the first drive switch 704 is ON, whereas when the input thereto is low, it is OFF. The second drive switch 705 comprises a n-channel FET and its body diode, and when the input to the second drive switch 705 is high, the second drive switch 705 is ON, whereas when the input thereto is low, it is OFF.

The driving circuit 401 connected to the switching device 400 outputs a drive signal of the switching device 400 according to the PWM signal output from the PWM control circuit 15. Furthermore, the PWM signal output from the PWM control circuit 15 is input to a drive control circuit 710 of the drive transformer control circuit 700. In the drive control circuit 710, the PWM signal is input to a first turn-on delay circuit 702. The PMW signal inverted by an inverter 701 is input to a second turn-on delay circuit 703.

The first turn-on delay circuit 702 shown in FIG. 3 comprises the resistance (23) and the capacitor (24) as shown in FIG. 1 mentioned above. The signal from the first turn-on delay circuit 702 is input via the reverse to the first drive switch 704. The converter is configured so that the turn-on of the first drive switch 704 is delayed by the first turn-on delay circuit 702. The turn-off thereof is driven without delay. In this forward converter, the first drive switch 704 comprises a p-channel FET. The first drive switch 704 is ON/OFF-driven according to the input PWM signal.

Similarly, the second turn-on delay circuit 703 shown in FIG. 3 comprises the resistance (27) and the capacitor (28) as shown in FIG. 1 mentioned above. The signal from the second turn-on delay circuit 703 is input to the second drive switch 705. The converter is configured so that the turn-on of the second drive switch 705 is delayed by the second turn-on delay circuit 703. The turn-off thereof is driven without delay.

The first drive switch 704 and the second drive switch 705 are connected in series, and receives a power supply from the auxiliary power supply 14. One end of a capacitor 715 is connected to the connection point of the first drive switch 704 and the second drive switch 705. A primary winding 800a of a drive transformer 800 is connected to the other end of the capacitor 715. The drive transformer 800 has the primary winding 800a and a secondary winding 800b.

The series circuit of a capacitor 801 and a diode 802 is connected to the secondary side of the drive transformer 800. The synchronous rectifier device 502 is connected so as to be driven by the applied voltage of the diode 802.

Figure 4:
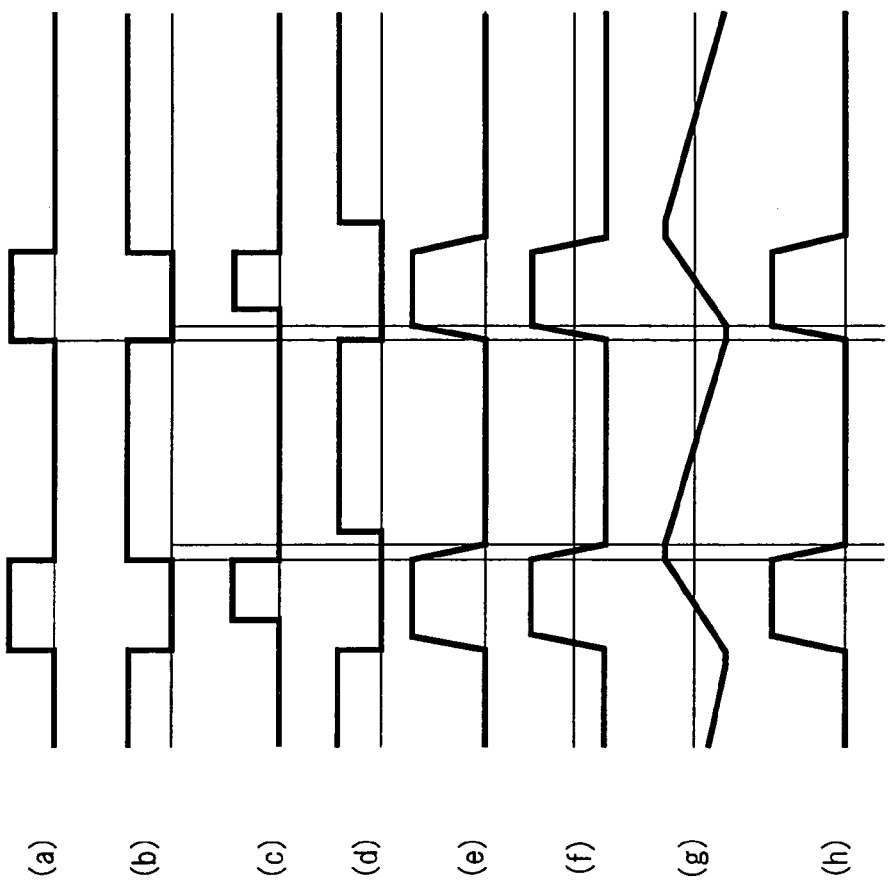
FIG. 4 is a waveform diagram showing the operation in the forward converter in FIG. 3.

In the forward converter configured as mentioned above which is shown in FIG. 3, the operation of the waveform shown in FIG. 4 is performed.

In the waveform diagram shown in FIG. 4, part (a) represents a PWM signal output from the PWM control circuit 15 and part (b) represents the inverted PWM signal. Part (c) of FIG. 4 shows a waveform of a signal Q1 output from the first turn-on delay circuit 702. Part (d) of FIG. 4 shows a waveform of a signal Q2 output from the second turn-on delay circuit 703. Part (e) of FIG. 4 represents a waveform of the voltage across the second drive switch 705. Part (f) of FIG. 4 represents a waveform of the applied voltage of the primary winding 800a of the drive transformer 800. Part (g) of FIG. 4 shows a waveform of the current of the drive transformer 800. Part (h) of FIG. 4 shows a waveform of the drive signal of the synchronous rectifier device 502.

Part (g) of FIG. 4 represents the waveform of the current of the drive transformer 800 and shows the exciting energy. An exciting inductance of the drive transformer 800 is set small, so that the exciting current flows through the drive transformer 800. The converter operates so that the parasitic capacitor including the gate capacitance of the synchronous rectifier device 502 is charged and discharged by this exciting current.

Incidentally, the forward converter in FIG. 3 has been described with the example where the synchronous rectification means 500 comprise the synchronous rectifier device 502 and the diode 501, but instead of this diode 501, it may comprises a synchronous rectifier device such as a MOSFET. In this case, if the synchronous rectifier device which substitutes as the diode 501 is driven so as to perform ON/OFF operation inversely with that of the synchronous rectifier device 502, the converter can be driven as with the forward converter shown in FIG. 3.

FIG. 5 is a circuit diagram showing a configuration of a single flyback converter, which is another variation of the switching power supply in accordance with Embodiment 1 of the present invention.

In FIG. 5, the same numerals are applied to the components having the functions and structures which are substantially the same as those of the single forward converter shown in FIG. 3, whereby the descriptions thereof are omitted.

As shown in FIG. 5, one end of the secondary winding 900b of the transformer 900 is connected to one end of a smoothing capacitor 651 of a smoothing means 650. The other end of the secondary winding 900b of the transformer 900 is connected to a synchronous rectifier device 551 of a synchronous rectification means 550. The synchronous rectifier device 551 comprises a MOSFET. The synchronous rectifier device 551 is connected in series with the smoothing capacitor 651. The series circuit of the synchronous rectifier device 551 and the smoothing capacitor 651 is connected across the secondary winding 900b of the transformer 900. The load 13 is connected across the smoothing capacitor 651 constituting the smoothing means 650.

The driving circuit 401 connected to the switching device 400 outputs a drive signal of the switching device 400 according to the PWM signal output from the PWM control circuit 15. Furthermore, the PWM signal output from the PWM control circuit 15 is input to a drive control circuit 720 of a drive transformer control circuit 750. In the drive control circuit 720, the PWM signal is input to a second turn-on delay circuit 723. The PMW signal inverted by an inverter 721 is input to a first turn-on delay circuit 722.

The first turn-on delay circuit 722 shown in FIG. 5 comprises the resistance (27) and the capacitor (28) as shown in FIG. 1 mentioned above. The signal from the first turn-on delay circuit 722 is input to a first drive switch 724. The first drive switch 724 comprises a p-channel FET, its body diode and a reverse, and is configured so that when the input is high, the first drive switch 724 is in the ON state, whereas when the input is low, it is in the OFF state. The converter is configured so that the turn-on of the first drive switch 724 is delayed by the first turn-on delay circuit 722. The turn-off thereof is driven without delay. The first drive switch 724 is ON/OFF-driven according to the input PWM signal.

Likewise, the second turn-on delay circuit 723 shown in FIG. 5 comprises the resistance (23) and the capacitor (24) as shown in FIG. 1 mentioned above. The signal from the second turn-on delay circuit 723 is input to a second drive switch 725. The second drive switch comprises a n-channel FET and its body diode. The converter is configured so that the turn-on of the second drive switch 725 is delayed by the second turn-on delay circuit 723. The turn-off thereof is driven without delay. The second drive switch 725 is ON/OFF-driven according to the input PWM signal.

The first drive switch 724 and the second drive switch 725 are connected in series, and receives a power supply from the auxiliary power supply 14. One end of a capacitor 730 is connected to the connection point of the first drive switch 724 and the second drive switch 725, while the primary winding 800*a* of the drive transformer 800 is connected to the other end of the capacitor 730. The drive transformer 800 has the primary winding 800*a* and the secondary winding 800*b*.

The series circuit of the capacitor 801 and the diode 802 is connected to the secondary side of the drive transformer 800. The synchronous rectifier device 551 is connected so as to be driven by the applied voltage of the diode 802.

Figure 6:
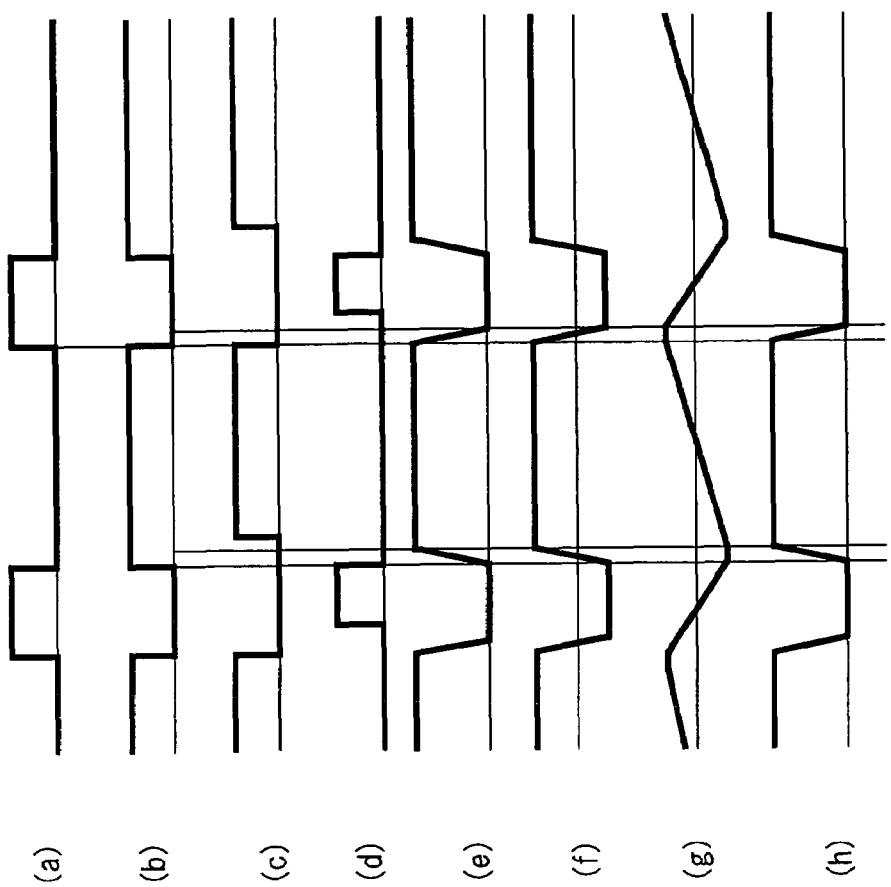
FIG. 6 is a waveform diagram showing the operation in the flyback converter in FIG. 5.

In the flyback converter configured as mentioned above which is shown in FIG. 5, the operation of the waveform shown in FIG. 6 is performed.

In the waveform diagram of FIG. 6, part (a) represents the PWM signal output from the PWM control circuit 15, and part (b) represents the inversed PWM signal. Part (c) of FIG. 6 shows a waveform of a signal Q1 output from the first turn-on delay circuit 722. Part (d) of FIG. 6 shows a waveform of a signal Q2 output from the second turn-on delay circuit 723. Part (e) of FIG. 6 is a waveform of the voltage across the second drive switch 725. Part (f) of FIG. 6 is a waveform of the applied voltage of the primary winding 800*a* of the drive transformer 800. Part (g) of FIG. 6 shows a waveform of the current of the drive transformer 800. Part (h) of FIG. 6 shows a waveform of a drive signal of the synchronous rectifier device 551.

Part (g) of FIG. 6 is a waveform of the current of the drive transformer 800, and shows exciting energy. Since the exciting inductance of the drive transformer 800 is set small, the exciting current is flowing through the drive transformer 800. The converter operates so that a parasitic capacitance including the gate capacitance of the synchronous rectifier device 551 is charged and discharged by this exciting current.

Embodiment 2

FIG. 7 is a circuit diagram showing a configuration of a switching power supply in accordance with Embodiment 2 of the present invention. In Embodiment 2, the same numerals are applied to the components having the same functions and structures as those in accordance with Embodiment 1 have.

In FIG. 7, the input DC power supply 1 comprises the circuit for rectifying and smoothing the commercial power supply or the battery and is connected across the input terminals 2*a* and 2*b*. The first switching device 3 and the second switching device 4 each comprise a MOSFET. The series circuit of the first switching device 3 and the second switching device 4 is connected across the input terminals 2*a* and 2*b*. The first switching device 3 and the second switching device 4 are alternately ON/OFF-driven by a first driving circuit 56 and a second driving circuit 57. Likewise, the third switching device 5 and the fourth switching device 6 each comprise a MOSFET. The series circuit of the third switching device 5 and the forth switching device 6 is connected across the input terminals 2*a* and 2*b*. The third switching device 5 and the fourth switching device 6 are alternately ON/OFF-driven by a third driving circuit 58 and a fourth driving circuit 59.

A transformer 70 has a primary winding 70*a*, a first secondary winding 70*b* and a second secondary winding 70*c*. One end of the primary winding 70*a* is connected to the connection point of the first switching device 3 and the second switching device 4. The other end of the primary winding 70*a* is connected to the connection point of the third switching device 5 and the fourth switching device 6. The first secondary winding 70*b* and the second secondary winding 70*c* of the transformer 70 are connected in series. The connection point of the first secondary winding 70*b* and the second secondary winding 70*c* of the transformer 70 is connected to one end of the inductance device 10.

The first synchronous rectifier device 8 and the second synchronous rectifier device 9 each comprise a MOSFET. Source terminals of the first synchronous rectifier device 8 and the second synchronous rectifier device 9 are connected to each other. The drain terminal of the first synchronous rectifier device 8 is connected to the second secondary winding 70*c*, while the drain terminal of the second synchronous rectifier device 9 is connected to the first secondary winding 70*b*.

One end of the series circuit of the inductance device 10 and the smoothing capacitor 11 is connected to the connection point of the source terminals of, respectively, the first synchronous rectifier device 8 and the second synchronous rectifier device 9. The other end of this series circuit is connected to the connection point of the first secondary winding 70*b* and the second secondary winding 70*c* of the transformer 70. The smoothing circuit is comprised of the inductance device 10 and the smoothing capacitor 11.

The output terminals 12*a* and 12*b* which output stable electric power are provided across the smoothing capacitor 11, and the load 13 which consumes electric power is connected across the output terminals 12*a* and 12*b*.

The PWM control circuit 15 generates a PWM signal according to a feedback signal from the photocoupler 54. The first driving circuit 56 to the fourth driving circuit 59 connected to, respectively, the first switching device 3 to the fourth switching device 6 output drive signals of the first switching device 3 to the fourth switching device 6 respectively according to PWM signals VG1 and VG2 output from the PMW control circuit 15.

The inverters 17 and 18 connected to the PMW control circuit 15 invert the PWM signals VG1 and VG2 respectively output from the PMW control circuit 15. In order to achieve zero-voltage turn-on of the first switching device 3 to the fourth switching device 6, the first driving circuit 56 to the fourth driving circuit 59 are adjusted so as to delay slightly the timing of the turn-on thereof.

The series circuit of the third capacitor 31 and the primary winding 32a of the first drive transformer 32 is connected across the third switching device 5. The fourth capacitor 33 and the third diode 34 are connected in series with the secondary winding 32b of the first drive transformer 32.

The third diode 34 is connected to the first synchronous rectifier device 8 so that the first synchronous rectifier device 8 is driven by the applied voltage of the third diode 34. The fifth capacitor 36 is charged via the fourth diode 35 by the voltage induced across the third diode 34.

The series circuit of the eighth capacitor 45 and the primary winding 46a of the second drive transformer 46 is connected across the first switching device 3. The ninth capacitor 47 and the seventh diode 48 are connected in series with the secondary winding 46b of the second drive transformer 46.

The seventh diode 48 is connected to the second synchronous rectifier device 9 so that the second synchronous rectifier device 9 is driven by the applied voltage of the seventh diode 48. The fifth capacitor 36 is charged via the eighth diode 49 by the voltage induced across the seventh diode 48.

The switching power supply is configured so that the voltage across the output terminals 12a and 12b is input to the output voltage detection circuit 300, detected therein, and fed back to the PWM control circuit 15. In the output voltage detection circuit 300, the output voltage is divided by the first detection resistance 50 and the second detection resistance 51, and is compared with the reference voltage of the reference power supply 52 and amplified by the differential amplifier 53. The amplified signal is input via the limit resistance 55 to the photocoupler 54, so that the input current of the photocoupler 54 is determined. The PWM control signal of the PWM control circuit 15 is adjusted by the output current of the photocoupler 54.

A feedback circuit is comprised of the output voltage detection circuit 300 configured as mentioned above, so that the output voltage is stabilized. The operation of the switching power supply in accordance with Embodiment 2 configured as mentioned above will be described referring to the waveform diagram in FIG. 8.

Figure 8:
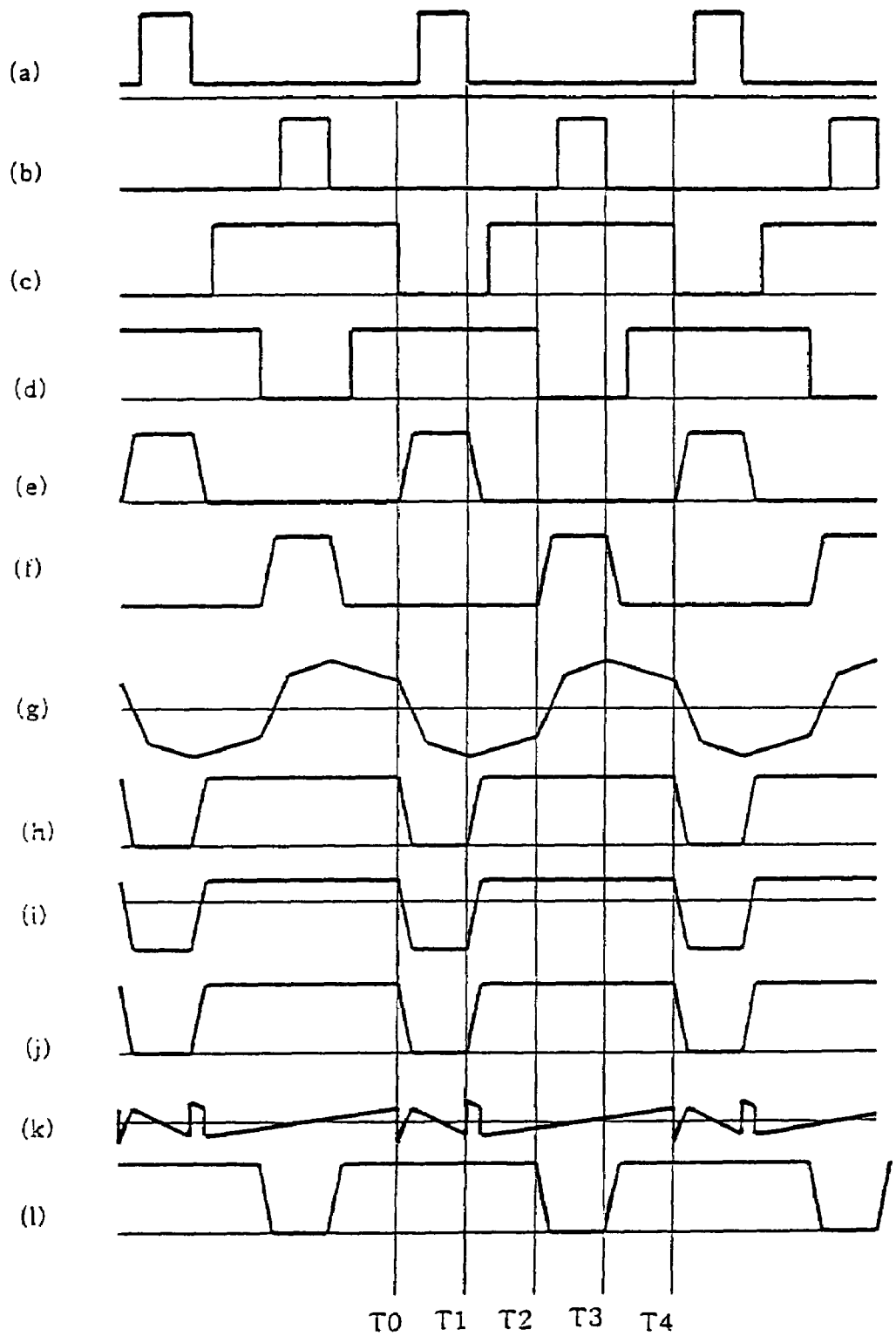
FIG. 8 is a waveform diagram showing the operation in the switching power supply in accordance with Embodiment 2 of the present invention.
Figure 9:
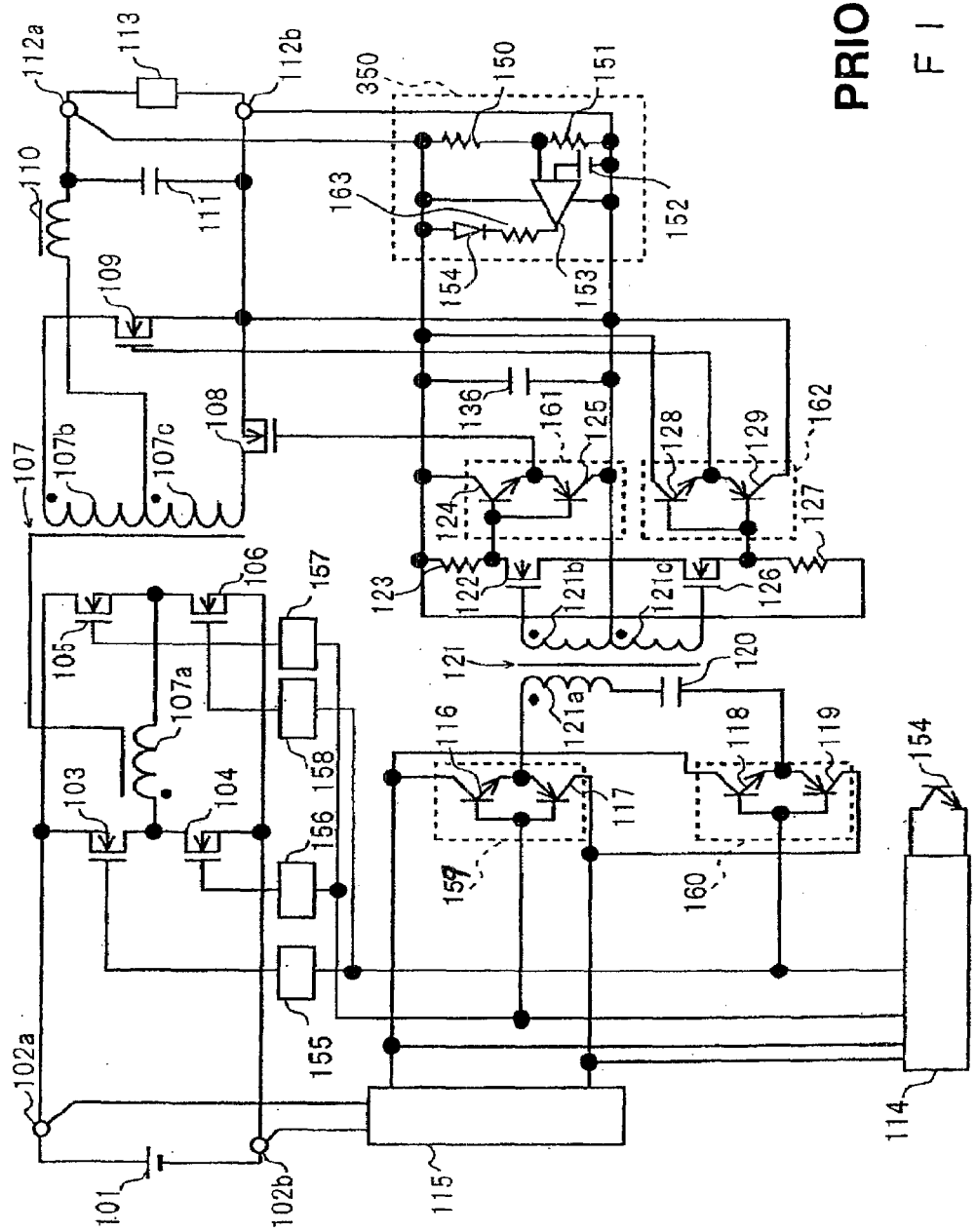
FIG. 9 is a circuit diagram showing a configuration of a conventional switching power supply.
Figure 10:
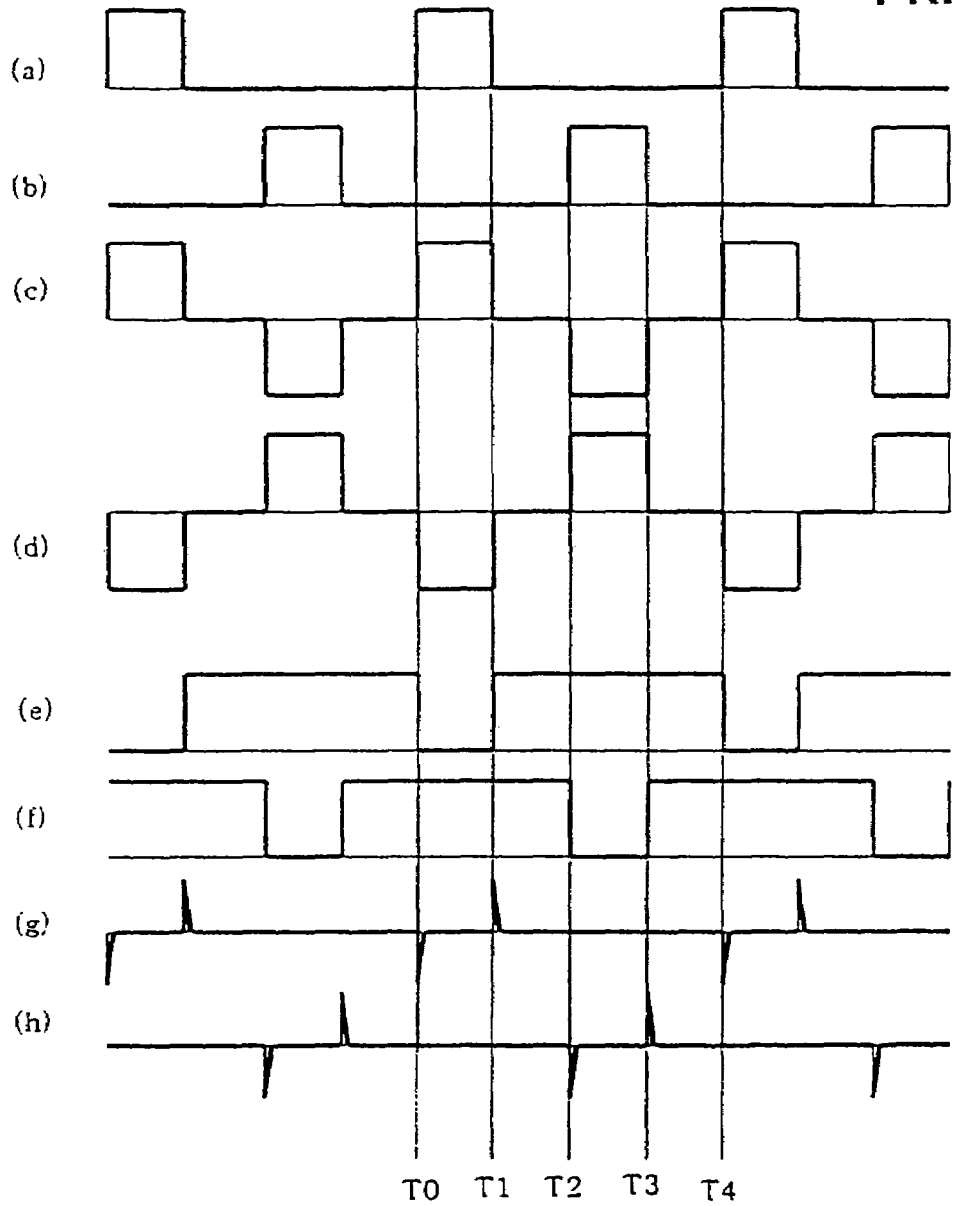
FIG. 10 is a waveform diagram showing the operation in the switching power supply in FIG. 9.

In FIG. 8, Part (a) shows a drive signal VG1A output from the PWM control circuit 15 to drive the first switching device 3 via the first driving circuit 56, and part (b) shows a drive signal VG3A output from the PWM control circuit 15 to drive the third switching device 5 via the third driving circuit 58. The drive signal VG3A is a signal 180 degrees out of phase with the drive signal VG1A output from the PWM control circuit 15. Likewise, part (c) of FIG. 8 shows a drive signal VG2A output from PWM control circuit 15 to drive the second switching device 4 via the first reverse 17 and the second driving circuit 57. Part (d) of FIG. 8 shows a drive signal VG4A output from PWM control circuit 15 to drive the fourth switching device 6 via the second reverse 18 and the fourth driving circuit 59. The drive signal VG4A is a signal 180 degrees out of phase with the drive signal VG2A output from the PWM control circuit 15. The first driving circuit 56 to the fourth driving circuit 59 are each set so that the timing of the turn-on lags behind the input. The drive signals VG1A and VG2A are set so that the first switching device 3 and the second switching device 4 have the period during which they are simultaneously placed in the OFF state. The drive signals VG3A and VG4A are set that the third switching device 5 and the fourth switching device 6 have the period during which they are simultaneously placed in the OFF state. The drive signals VG1A, VG2A, VG3A and VG4A shown in FIG. 8 represent signals output from the first driving circuit 56 to the fourth driving circuit 59 respectively.

Part (e) of FIG. 8 shows a waveform VD2 of the applied voltage of the second switching device 4. Part (f) of FIG. 8 shows a waveform VD4 of the applied voltage of the fourth switching device 6. Part (g) of FIG. 8 shows a waveform Ip of the current flowing through the primary winding 70a of the transformer 70. Part (h) of FIG. 8 shows an applied voltage VD1 of the first switching device 3. Part (i) of FIG. 8 shows a waveform VT of the voltage of the primary winding 32a of the first drive transformer 32. Part (j) of FIG. 8 shows a waveform VSG1 of the drive voltage of the first synchronous rectifier device 8. Part (k) of FIG. 8 shows a waveform It of the current of the primary winding 32a of the first drive transformer 32. Part (l) of FIG. 8 shows a waveform VSG2 of the drive voltage of the second synchronous rectifier device 9.

The switching power supply in accordance with Embodiment 2 differs from the switching power supply in accordance with Embodiment 1 mentioned above in that the input of the first drive transformer 32 can be obtained from the third switching device 5 and the input of the second drive transformer 46 can be obtained from the first switching device 3. The switching power supply in accordance with Embodiment 2 further differs from the switching power supply in accordance with Embodiment 1 in that the configuration is such that the gate capacitances of the first synchronous rectifier device 8 and the second synchronous rectifier device 9 can be discharged via the first drive transformer 32 and the second drive transformer 46 into the exciting inductance and the leakage inductance of the transformer 70.

The operation of the switching power supply in accordance with Embodiment 2 configured as mentioned above will be described referring to the waveform diagram of FIG. 8.

When a signal of the PWM signal VG1 of the PWM control circuit 15 is input via the first driving circuit 56 to the first switching device 3 and the first switching device 3 is thereby turned ON, the input voltage is applied to the primary winding 70a of the transformer 70 through the fourth switching device 6 in the ON state. At this time, energy is stored in the leakage inductance and the exciting inductance of the transformer 70. At the same time, the input voltage is applied to the series circuit of the primary winding 32a of the first drive transformer 32 and the third capacitor 31, and the input of the series circuit of the primary winding 46a of the second drive transformer 46 and the eighth capacitor 45 is short-circuited.

The third capacitor 31 and the eighth capacitor 45 retain DC components of the voltages applied to, respectively, the third switching device 5 and the first switching device 3, and apply only the AC components thereof to the primary winding 32a of the first drive transformer 32 and the primary winding 46a of the second drive transformer 46.

The fourth capacitor 33 connected to the secondary winding 32b of the first drive transformer 32 is charged via the third diode 34 when a negative voltage is generated in the secondary winding 32b of the first drive transformer 32. Likewise, the ninth capacitor 47 connected to the secondary winding 46b of the second drive transformer 46 is charged via the seventh diode 48 when a negative voltage is generated in the secondary winding 46b of the second drive transformer 46.

The minimum value of the applied voltages of the first switching device 3 and the third switching device 5 is zero. Therefore, the applied voltages of the third capacitor 31 and the fourth capacitor 33, and the applied voltages of the eighth capacitor 45 and the ninth capacitor 47 become the voltages proportional to the turns ratios of the first drive transformer 32 and the second drive transformer 46 (when the turns ratio is 1:1, the voltages become the same). Thus, the voltage generated at the third diode 34, in other words, the voltage applied to the first synchronous rectifier device 8 takes a waveform similar to that of the applied voltage of the third switching device 5. By appropriately selecting the turns ratio of the first drive transformer 32, the drive voltage of the first synchronous rectifier device 8 can be set to a desired value. Likewise, the voltage applied to the second synchronous rectifier device 9 takes a waveform similar to that of the voltage applied to the first switching device 3, and by appropriately selecting the turns ratio of the second drive transformer 46, the second synchronous rectifier device 9 can be driven at a desired value.

When the first switching device 3 and the fourth switching device 6 are in the ON state as mentioned above, the input voltage is applied to the third switching device 5 and a turn-on signal is generated at the gate of the first synchronous rectifier device 8, so that the first synchronous rectifier device 8 is turned ON. Since the applied voltage of the first switching device 3 is zero at this time, the drive voltage of the second synchronous rectifier device 9 is zero, so that the second synchronous rectifier device 9 is in the OFF state.

When the input voltage is applied to the primary winding 70a of the transformer 70, the voltages proportional to the turns ratio of the transformer 70 are also generated in the secondary windings 70b and 70c of the transformer 70, so that the voltages are applied to the series circuit of the inductance device 10 and the smoothing capacitor 11 through the first synchronous rectifier device 8 in the ON state.

When the first switching device 3 is turned OFF under an OFF signal of the PWM signal from the PWM control circuit 15 (drive signal VG1A) at time T1 shown in FIG. 8, the current of the primary winding 70a of the transformer 70 becomes continuous under the influence of the leakage inductance of the transformer 70. Therefore, the gate voltage of the second synchronous rectifier device 9 is charged via the second drive transformer 46. Furthermore, when the voltage across the second switching device 4 drops to zero, the body diode of the second switching device 4 is turned ON. At the same time, the PWM waveform is inverted by the first inverter 17 serving as the first reverse, the ON signal is slightly delayed by the second driving circuit 57, and then the second switching device 4 is turned ON. At this time, by setting the delay time appropriately, the second switching device 4 can be turned ON after the drive voltage of the second synchronous rectifier device 9 is fully raised. At this time, the voltage of the primary winding 70a of the transformer 70 is zero and the energy stored in the transformer 70 is retained. The voltages generated in the secondary windings 70b and 70c of the transformer 70 are zero, and the current flowing through the inductance device 10 are divided to flow through the first secondary winding 70b and the second secondary winding 70c of the transformer 70 via the first synchronous rectifier device 8 and the second synchronous rectifier device 9 in the ON state so that the energy stored in the transformer 70 is made continuous. At this time, the applied voltage of the inductance device 10 and the smoothing capacitor 11 is zero.

When the drive signal VG4A is input via the fourth driving circuit 59 and the fourth switching device 6 is turned OFF under an OFF signal of the PWM signal from the PWM control circuit 15 at time T2, the gate charge of the first synchronous rectifier device 8 is discharged via the first drive transformer 32 by the energy stored in the transformer 70. This discharge current is regenerated to the input voltage via the second switching device 4 in the ON state. At this time, the applied voltage of the fourth switching device 6 rises, and when the applied voltage of the third switching device 5 becomes zero, the body diode of the third switching device 5 is turned ON. When an ON signal of the PWM signal from the PWM control circuit 15 is delayed by the third driving circuit 58 (drive signal VG3A), and the ON signal is applied to the third switching device 5, the third switching device 5 is turned ON. At this time, by setting the delay time so that the third switching device 5 is turned ON after the drive voltage of the first synchronous rectifier device 8 fully drops, the discharge current of the first synchronous rectifier device 8 can be regenerated to the input side.

When the third switching device 5 is turned ON, the input voltage is reversely applied to the primary winding 70a of the transformer 70 via the second switching device 4 in the ON state. At this time, the first synchronous rectifier device 8 is in the OFF state, but the current continues to flow through the body diode included therein. When the input voltage is reversely applied to the primary winding 70a of the transformer 70, the current of the primary winding 70a of the transformer 70 decreases sharply. If the current which corresponds to the current of the inductance device 10 is supplied, the body diode of the first synchronous rectifier device 8 is turned OFF. Therefore, voltages are generated in the secondary windings 70b and 70c of the transformer 70, and the generated voltages are applied to the series circuit of the inductance device 10 and the smoothing capacitor 11 via the second synchronous rectifier device 9 in the ON state. As a result, the oppositely directed energy is stored in the leakage inductance and the exciting inductance of the transformer 70.

When the third switching device 5 is turned OFF under an OFF signal of the PWM signal from the PWM control circuit 15 at time T3, the current of the primary winding 70a of the transformer 70 becomes continuous under the influence of the leakage inductance of the transformer 70. Therefore, the gate voltage of the first synchronous rectifier device 8 is charged via the first drive transformer 32, and when the voltage across the fourth switching device 6 drops to zero, the body diode of the fourth switching device 6 is turned ON. At the same time, the PWM waveform is inverted by the second inverter 18 serving as the second reverse, an ON signal is slightly delayed by the fourth driving circuit 59, and then the fourth switching device 6 is turned ON. At this time, by setting the delay time appropriately, the fourth switching device 6 can be turned ON after the drive voltage of the first synchronous rectifier device 8 is fully raised. At this time, the voltage of the primary winding 70a of the transformer 70 is zero and the energy stored in the transformer 70 is retained. The voltages generated in the secondary windings 70b and 70c of the transformer 70 are zero. The current flowing thorough the inductance device 10 is divided to flow through the first secondary winding 70b and the second secondary winding 70c of the transformer 70 via the first synchronous rectifier device 8 and the second synchronous rectifier device 9 in the ON state so that the energy stored in the transformer 70 is made continuous. At this time, the applied voltage of the inductance device 10 and the smoothing capacitor 11 becomes zero.

When the second switching device 4 is turned OFF via the second driving circuit 57 under an OFF signal of the PWM signal from the PWM control circuit 15 at time T4, the gate charge of the second synchronous rectifier device 9 is discharged via the second drive transformer 46 by the energy stored in the transformer 70. This discharge current is regenerated to the input voltage via the fourth switching device 6 in the ON state. At this time, the applied voltage of the second switching device 4 rises, and when the applied voltage of the first switching device 3 becomes zero, the body diode of the first switching device 3 is turned ON.

When an ON signal of the PWM signal from the PWM control circuit 15 is delayed by the first driving circuit 56, and the ON signal is applied to the first switching device 3, the first switching device 3 is turned ON. At this time, by setting the delay time so that the first switching device 3 is turned ON after the drive voltage of the second synchronous rectifier device 9 drops fully, the discharge current of the second synchronous rectifier device 9 can be regenerated to the input side.

When the first switching device 3 is turned ON, the input voltage is reversely applied to the primary winding 70a of the transformer 70 via the fourth switching device 6 in the ON state. At this time, the second synchronous rectifier device 0.9 is in the OFF state, but the current continues to flow through the body diode included therein. When the input voltage is applied to the primary winding 70a of the transformer 70, the current of the primary winding 70a of the transformer 70 increases sharply and the current corresponding to the current of the inductance device 10 is supplied. As a result, the body diode of the second synchronous rectifier device 9 is turned OFF. Thus, voltages are generated in the secondary windings 70b and 70c of the transformer 70, and the generated voltages are applied to the series circuit of the inductance device 10 and the smoothing capacitor 11 via the first synchronous rectifier device 8 in the ON state. Therefore, energy is stored in the leakage inductance and the exciting inductance of the transformer 70.

In the switching power supply in accordance with Embodiment 2, the ON/OFF operation mentioned above is repeated. Under the controlled signal output from the PWM control circuit 15, the period during which the voltage is applied to the series circuit of the inductance device 10 and the smoothing capacitor 11 varies, whereby the output voltage can be controlled.

Since the configuration is employed in which the energy used for charge and discharge of each gate capacitance of the first synchronous rectifier device 8 and the second synchronous rectifier device 9 can be sequentially regenerated to the input voltage as mentioned above, the drive loss can be nearly zero.

Therefore, according to Embodiment 2 of the present invention, a high-efficiency switching power supply can be configured, and the losses can be reduced therein, so that the structure for heat dissipation becomes unnecessary, whereby the reduction in size is made possible. In addition, in the configuration in accordance with Embodiment 2, the operation to charge and discharge the parasitic capacitances of the first switching device 3 to the fourth switching device 6 is made possible by the ability of the transformer 70 to hold energy, and these parasitic capacitances are discharged immediately before the turn-on thereof, whereby the switching losses can be reduced.

In Embodiment 2, since the configuration is employed in which the energy stored in the transformer 70 is used for charge and discharge of each gate of the first synchronous rectifier device 8 and the second synchronous rectifier device 9, relatively high energy can be easily obtained, whereby it is not necessary to store energy in the first drive transformer 32 and the second drive transformer 46. As a result, the capacitances of the first drive transformer 32 and the second drive transformer 46 can be set smaller than those of the first drive transformer 32 and the second drive transformer 46 in accordance with Embodiment 1 mentioned above.

Incidentally, in Embodiment 2 mentioned above, the configuration is employed in which the ON/OFF control of the first synchronous rectifier device 8 and the second synchronous rectifier device 9 is performed based on the applied voltages of the first switching device 3 and the third switching device 5, but if the ON/OFF control thereof is performed based on the applied voltages of the second switching device 4 and the fourth switching device 6 and the first drive transformer 32 and the second drive transformer 46 is changed in polarity, the operation which is quite the same as that of the switching power supply in accordance with Embodiment 2 can be performed.

In Embodiment 2, the operation has been described based on the full-bridge converter, but the present invention is not limited to such a configuration. For example, even when a half-bridge converter or a push-pull converter is used, to which a circuit for short-circuiting the transformer is added, the operation which is similar to that in accordance with Embodiments 1 and 2 mentioned above can be performed. In the case of such a configuration, as a circuit for short-circuiting the transformer, the series circuit of two switches corresponding to the timing of the ON/OFF operation of the second switching device 4 and the fourth switching device 6 shown in FIG. 7 is used, and the synchronous rectifier device is driven under the inverse signal of the voltage applied to each of these two switches. By configuring as mentioned above, a similar effect to that of the switching power supply in accordance with Embodiment 2 can be obtained.

It is needless to say that, by applying the present invention not only to the bridge converter and the push-pull converter, but to the circuit which stores energy in a transformer and uses the stored energy so that the circuit can charge and discharge the parasitic capacitances of more than one switching device configured so as to have a minuscule stop period and repeat the ON/OFF operation, the gate of the synchronous rectifier device can be driven without any loss by the drive transformer.

As is apparent from the above-mentioned detailed descriptions of the embodiments, the switching power supply of the present invention has the following effects.

According to the present invention, a high-efficiency switching power supply can be provided which supplies a voltage with stability while carrying out charge and discharge of the gate of the synchronous rectifier device without any loss, and can exert fully the effect of the synchronous rectification.

In the switching power supply of the present invention, the configuration is such that the energy used for charge and discharge of the gate capacitance of the synchronous rectifier device is sequentially regenerated to the input voltage, whereby the drive loss can be substantially zero. Therefore, according to the present invention, a high-efficiency switching power supply can be configured, and the losses can be reduced therein, whereby the structure for heat dissipation becomes unnecessary, so that the reduction in size can be made possible.

In addition, in the switching power supply of the present invention, charge and discharge of the parasitic capacitances of the first switching device to the fourth switching device can be carried out at the transformer, and these parasitic capacitances are discharged immediately before the turn-on thereof, so that the switching losses can be reduced.

INDUSTRIAL APPLICABILITY

Since the present invention can provide a high-efficiency switching power supply which can supply a voltage with stability while carrying out charge and discharge of the gate of a synchronous rectifier device without any loss, it is useful as an industrial and consumer electronic appliance.

The invention claimed is:
1. A switching power supply comprising:
at least two switching sections which have minuscule stop periods and repeat ON/OFF operation to convert an input voltage to an AC voltage;

a transformer which has a primary winding, to which the AC voltage obtained by the conversion performed by said switching sections is applied, and a secondary winding, and stores exciting energy;

a synchronous rectifier section for rectifying a voltage induced in the secondary winding of said transformer by switching operation;

a smoothing section for smoothing the voltage rectified by said synchronous rectifier section to form an output voltage;

a PWM control circuit which forms a PWM signal for controlling said output voltage to determine an ON/OFF ratio of said switching sections; and a drive transformer for ON/OFF-driving said synchronous rectifier section according to said PWM signal or a voltage signal applied to said switching sections, wherein a first winding of the drive transformer is directly connected to the switching sections, and the switching operation of said synchronous rectifier section is performed via the drive transformer by the energy stored in the transformer which has a primary winding.

2. A switching power supply in accordance with claim 1, wherein the PWM control circuit exercises control so that the switching sections short-circuits the primary winding of the transformer which has a primary winding, and sets the period during which energy necessary for the switching operation of the synchronous rectifier section can be retained in the transformer which has a primary winding.

* * * * *